United States Patent
Chung et al.

(10) Patent No.: US 9,473,271 B2
(45) Date of Patent: Oct. 18, 2016

(54) TELECOMMUNICATIONS METHODS FOR INCREASING RELIABILITY OF EARLY TERMINATION OF TRANSMISSION

(71) Applicant: MEDIATEK INC., Hsin-Chu (TW)

(72) Inventors: Pei-Shiun Chung, New Taipei (TW); Xiu-Sheng Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 312 days.

(21) Appl. No.: 13/798,150

(22) Filed: Mar. 13, 2013

(65) Prior Publication Data
US 2013/0322259 A1 Dec. 5, 2013

Related U.S. Application Data

(60) Provisional application No. 61/653,631, filed on May 31, 2012.

(51) Int. Cl.
*H04L 1/16* (2006.01)
*H04L 1/00* (2006.01)

(52) U.S. Cl.
CPC .......... *H04L 1/1607* (2013.01); *H04L 1/0035* (2013.01)

(58) Field of Classification Search
CPC ............. H04W 52/241; H04W 52/48; H04W 52/367; H04W 52/50; H04W 52/146; H04W 74/0833; H04B 17/0057
See application file for complete search history.

(56) References Cited

U.S. PATENT DOCUMENTS

| | | | |
|---|---|---|---|
| 2001/0023189 A1* | 9/2001 | Kajimura | 455/522 |
| 2002/0026618 A1* | 2/2002 | Wang | 714/786 |
| 2002/0128031 A1* | 9/2002 | Valkealahti | 455/522 |
| 2004/0141523 A1* | 7/2004 | Bhushan et al. | 370/469 |
| 2006/0019694 A1* | 1/2006 | Sutivong et al. | 455/522 |
| 2006/0135073 A1* | 6/2006 | Kurapati et al. | 455/67.11 |
| 2007/0138822 A1 | 6/2007 | Feit | |
| 2007/0168822 A1* | 7/2007 | Vitebsky et al. | 714/748 |
| 2008/0148133 A1* | 6/2008 | Duggan | 714/796 |
| 2008/0215948 A1* | 9/2008 | Pinheiro et al. | 714/748 |
| 2009/0022098 A1* | 1/2009 | Novak et al. | 370/329 |
| 2009/0083601 A1* | 3/2009 | Gorokhov et al. | 714/748 |
| 2009/0135754 A1* | 5/2009 | Yavuz et al. | 370/311 |
| 2009/0286563 A1* | 11/2009 | Ji et al. | 455/501 |
| 2009/0304024 A1* | 12/2009 | Jou et al. | 370/465 |

(Continued)

FOREIGN PATENT DOCUMENTS

| | | |
|---|---|---|
| CN | 101120531 A | 2/2008 |
| CN | 101919197 A | 12/2010 |
| CN | 102113278 A | 6/2011 |

*Primary Examiner* — Jung-Jen Liu
(74) *Attorney, Agent, or Firm* — Winston Hsu; Scott Margo

(57) ABSTRACT

An embodiment of the invention provides a telecommunications method to be performed by a first telecommunications device while trying to transmit a data block to a second telecommunications device. According to the embodiment, the first telecommunications device determines whether a first set of early termination criteria is satisfied. Then, if the first set of early termination criteria is satisfied, the first telecommunications device further determines whether a second set of early termination criteria is satisfied. The second set of early termination criteria is different from the first set of early termination criteria. If both the first set of early termination criteria and the second set of early termination criteria are satisfied before the first telecommunications device finishes transmitting the data block, the first telecommunications device reduces a transmission power.

20 Claims, 3 Drawing Sheets

(56) References Cited

U.S. PATENT DOCUMENTS

| | | | |
|---|---|---|---|
| 2010/0067441 A1* | 3/2010 | Kim et al. | 370/328 |
| 2010/0107028 A1* | 4/2010 | Gorokhov et al. | 714/748 |
| 2010/0128687 A1* | 5/2010 | Oteri et al. | 370/329 |
| 2010/0150069 A1* | 6/2010 | Fang et al. | 370/328 |
| 2010/0238876 A1* | 9/2010 | Yamamoto et al. | 370/329 |
| 2010/0272009 A1* | 10/2010 | Cheng et al. | 370/315 |
| 2010/0281337 A1* | 11/2010 | Lo et al. | 714/758 |
| 2010/0309865 A1* | 12/2010 | Kimura | 370/329 |
| 2012/0230218 A1* | 9/2012 | Mauritz et al. | 370/252 |
| 2013/0035084 A1* | 2/2013 | Song et al. | 455/418 |
| 2013/0107780 A1* | 5/2013 | Choi et al. | 370/311 |
| 2013/0201893 A1* | 8/2013 | Hu et al. | 370/311 |
| 2013/0223364 A1* | 8/2013 | Akkarakaran et al. | 370/329 |
| 2015/0030005 A1* | 1/2015 | Sambhwani et al. | 370/335 |

* cited by examiner

TELECOMMUNICATIONS METHODS FOR INCREASING RELIABILITY OF EARLY TERMINATION OF TRANSMISSION

CROSS REFERENCE TO RELATED APPLICATIONS

This application claims the benefit of U.S. provisional application No. 61/653,631, filed on May 31, 2012 and incorporated herein by reference.

BACKGROUND

1. Technical Field

The invention relates generally to telecommunications, and more particularly, to telecommunications methods that increase reliability of early termination of transmission.

2. Related Art

Telecommunications channels are frequently noisy and unreliable. As a result, if a first telecommunications device transmits M bits of data to a second telecommunications device without using any protection, the second telecommunications device may fail to recover some of the M bits correctly.

To deal with this and other problems, the two telecommunications devices may use some methods to protect the data. For example, the first telecommunications device may encode the M bits of data into N bits of data that permits error correction, where M and N are positive integers and N is greater than M. Then, the first telecommunications device may transmit the N bits of data, rather than only the M bits of data, to the second telecommunications device. Even if the second telecommunications device recovers some of the N bits incorrectly, it may still decode the M bits of data accurately through error correction.

The N bits of data may be contained in a data block and correspond to a specific transmission time interval (TTI). For example, for speech data, the TTI may be 20 ms long and contain 30 slots; each of the slots may contain 2,560 chips. One of the first and second telecommunications devices may be a base station (BS) or a Node B while the other may be a mobile station (MS) or a piece of user equipment (UE). The aforementioned transmission may be uplink or downlink transmission.

As long as the second telecommunications device has at least P bits of the N bits of data correctly, where P is a positive integer equal to or greater than M and equal to or less than N, the second telecommunications device should be able to successfully decode the M bits of data. In other words, it's possible for the second telecommunications device to not receive the whole data block but still recover the M bits of data correctly. Therefore, if the second telecommunications device determines that it can decode the data contained in a data block not yet fully received, the second telecommunications device may disregard a remaining part (i.e. a not yet received part) of the data block. This may help the second telecommunications device save some energy and time. In addition, the second telecommunications device may transmit a positive early termination indicator (ETI) to the first telecommunications device, advising the first telecommunications device to not transmit a remaining part (i.e. a not yet transmitted part, which may be smaller than the not yet received part because of time lag) of the data block. This may also help the first telecommunications device to save energy and reduce interference to other second telecommunications devices.

SUMMARY

An embodiment of the invention provides a telecommunications method to be performed by a first telecommunications device while trying to transmit a data block to a second telecommunications device. According to the embodiment, the first telecommunications device determines whether a first set of early termination criteria is satisfied. Then, if the first set of early termination criteria is satisfied, the first telecommunications device further determines whether a second set of early termination criteria is satisfied. The second set of early termination criteria is different from the first set of early termination criteria. If both the first set of early termination criteria and the second set of early termination criteria are satisfied before the first telecommunications device finishes transmitting the data block, the first telecommunications device reduces a transmission power.

Another embodiment of the invention provides a telecommunications method to be performed by a first telecommunications device while trying to transmit a data block to a second telecommunications device. According to the embodiment, the first telecommunications device determines whether a first set of early termination criteria is satisfied. Then, if the first set of early termination criteria is satisfied, the first telecommunications device further determines whether a second set of early termination criteria is satisfied. The second set of early termination criteria is different from the first set of early termination criteria.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

There are several ways for the second telecommunications device to transmit ETIs to the first telecommunications device. For example, after receiving every other Q pieces of a data block, where Q is a positive integer, the second telecommunications device may determine whether it has collected enough pieces of the data block for decoding. If the answer is yes, the second telecommunications device may send an acknowledgement (ACK) message to the first telecommunications device; otherwise, the second telecommunications device may send a negative acknowledgement (NACK) message to the first telecommunications device. Each of the pieces may be a slot of 2,560 chips; each ACK message may be regarded as a positive ETI; each NACK message may be regarded as a negative ETI. In this example, in transmitting a data block to the second telecommunications device, the first telecommunications device may receive several NACK messages and zero to several ACK messages. As another example, the second telecommunications device may send an ACK message (i.e. a positive ETI) to the first telecommunications device only if it has collected enough pieces of the data block; if otherwise, the second telecommunications device does not send a NACK message, i.e., send nothing as a representation of NACK. In this example, in transmitting a data block to the second telecommunications device, the first telecommunications device may receive zero to several ACKs.

There is likely a time lag between the timing when it's suitable for the second telecommunications device to send out an ETI and the timing when the first telecommunications device actually detects the ETI. For example, it takes some computation time for the second telecommunications device to determine whether to send out an ETI. Then, it takes some more time for the ETI to reach the first telecommunications device and for the first telecommunications device to detect the ETI. In other words, if the second telecommunications device may send out an ETI after receiving the xth piece of the data block, the first telecommunications device may detect the ETI only after it has sent out x+y pieces of the data block, where both x and y are positive integers. Because time delay is almost ubiquitous, further discussion of it will be omitted hereinafter.

In the real world, it sometimes happens that the second telecommunications device sends out an ETI mistakenly or the first telecommunications device detects an ETI erroneously. This may cause the first telecommunications device to stop transmitting pre-maturely and cause the second telecommunications device to be incapable of decoding the not fully transmitted data block. To deal with these and other potential problems, the first telecommunications device may need to act more carefully to increase the reliability of early termination of transmission.

Figure 1:
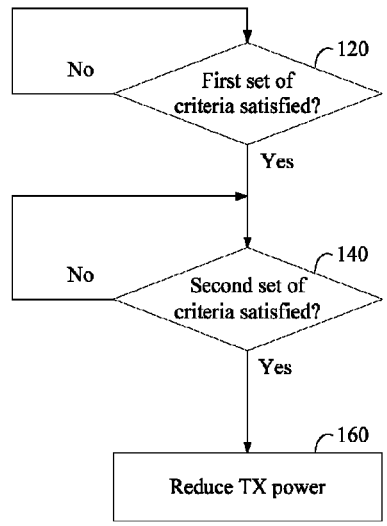
FIG. 1 shows a flowchart of a telecommunications method a first telecommunications device performs according to an embodiment of the invention.
Figure 2:
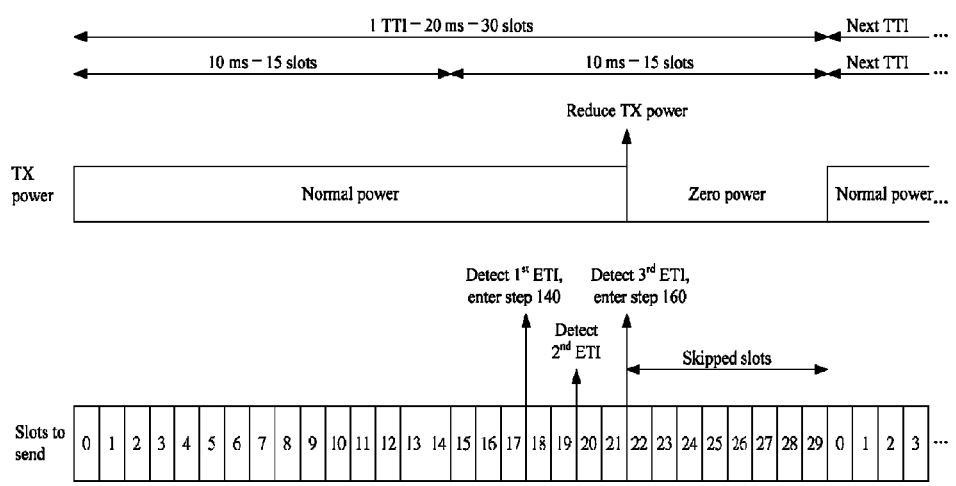
FIG. 2 to FIG. 5 shows several exemplary scenarios illustrating how the method of FIG. 1 may actually be performed while the first telecommunications device is trying to transmit a data block to a second telecommunications device.
Figure 3:
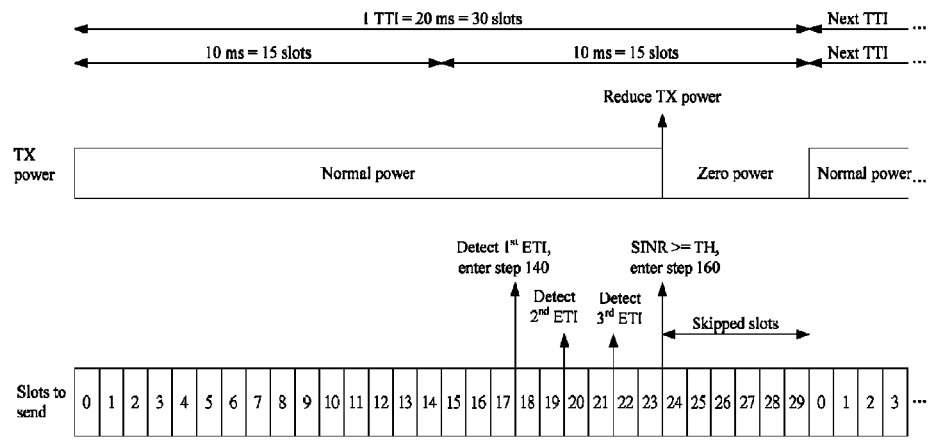
Figure 4:
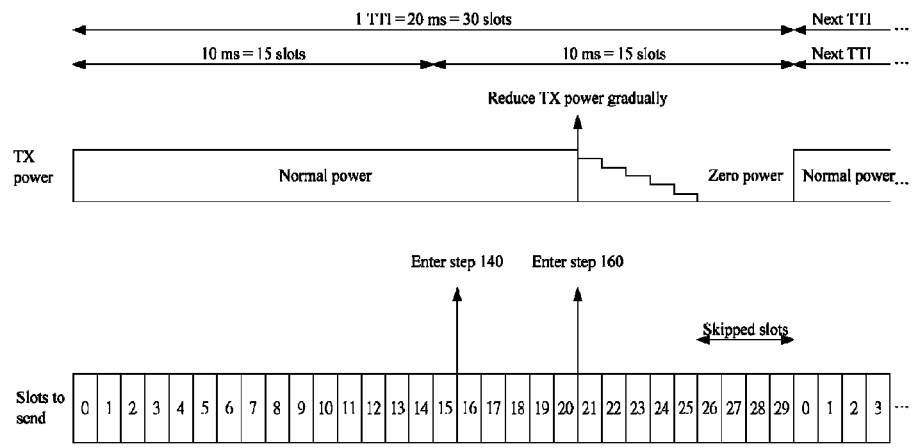
Figure 5:
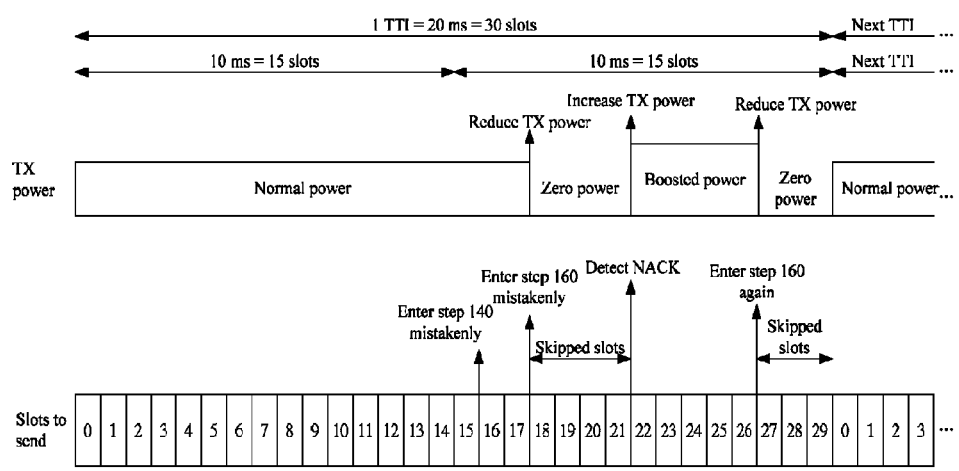

FIG. 1 shows a flowchart of a telecommunications method the first telecommunications device performs according to an embodiment of the invention. The first telecommunications device may perform this process every time it tries to transmit a data block to the second telecommunications device. The first telecommunications device may initiate this process (by entering step 120) just before transmitting a zth piece of the data block, where z may be a positive integer. Then, the first telecommunications device may end this process before starting transmitting a subsequent data block, regardless of whether it's at step 120, 140, or 160.

First, at step 120, the first telecommunications device determines whether a first set of early termination criteria is satisfied. As used herein, a set of criteria may include only one criterion or a plurality of criteria. If the first set of early termination criteria includes a plurality of criteria, the first telecommunications device may check the criteria in sequence (e.g. one after another), or check the criteria in a mixed way (e.g. all at once). Everything else remains the same, when an early termination criterion is satisfied, the first telecommunications device may be more confident in performing early termination safely.

If the first set of early termination criteria is satisfied, the first telecommunications device enters step 140; otherwise, it returns to step 120. At step 140, the first telecommunications device further determines whether a second set of early termination criteria (which is different from the first set of early termination criteria) is satisfied. If the second set of early termination criteria is also satisfied, the first telecommunications device enters step 160; otherwise, it goes back to step 140. If the second set of early termination criteria includes a plurality of criteria, the first telecommunications device may check the criteria in sequence (e.g. one after another), or check the criteria in a mixed way (e.g. all at once). Everything else remains the same, when an early termination criterion is satisfied, the first telecommunications device may be more confident in performing early termination safely. At step 160, the first telecommunications device reduces a transmission (TX) power for a remaining part of the data block.

FIG. 2 to FIG. 5 shows several exemplary scenarios illustrating how the method of FIG. 1 may actually be performed while the first telecommunications device is trying to transmit a data block to the second telecommunications device. These exemplary scenarios are drawn from the first telecommunications device's perspective. In these exemplary scenarios, a data block corresponds to a TTI that is 20 ms long and contains 30 slots. Each of the slots constitutes a basic piece of data transmission. The following paragraphs will use these exemplary scenarios to help explaining some exemplary details of the method depicted in FIG. 1.

Please refer to FIG. 1 again. For example, the first set of early termination criteria may include only one criterion, such as that the first telecommunications device detects an ACK transmitted by the second telecommunications device. As another example, the first set of early termination criteria may include that the first telecommunications device detects an ACK transmitted by the second telecommunications device and that the first telecommunications has already transmitted at least a predetermined number of pieces of the data block. For example, if the data block corresponds to a TTI of 30 slots, each of which constitutes a piece, the predetermined number may be 15. This means it's very unlikely that the second telecommunications device would be able to decode the data block with less than 15 slots, and hence the first telecommunications device should trust only ACKs detected after at least 15 slots are sent.

As mentioned above, it sometimes happens that the second telecommunications device sends out an ETI mistakenly or the first telecommunications device detects an ETI erroneously. As a result, it may not be the best practice for the first telecommunications device to enter step 160 merely because the first set of early termination criteria is satisfied. To increase the reliability of early termination of transmission, the method includes step 140 that allows the first telecommunications device to seek further assurance before entering step 160.

As mentioned above, the second set of early termination criteria is different from the first set of early termination criteria. One exemplary criterion of the second set of criteria is that the amount of ACK received for the data block is equal to or greater than a predetermined number. The predetermined number may be an integer equal to or greater than two. For example, the predetermined number may be three, meaning that early termination is allowed only if the first telecommunications device has received three or more ACKs while transmitting the current data block. The exemplary scenario shown in FIG. 2 may help explain this. In that scenario, the first telecommunications device leaves step 120 and enters step 140 just before transmitting the 18th slot because it detects a first ACK. Then, the first telecommunications device leaves step 140 and enters step 160 just before transmitting the 22th slot because it detects a third ACK. Once the first telecommunications device enters step 160, it reduces the transmission (TX) power from a normal power level to a zero power level.

Another exemplary criterion of the second set of criteria is that the first telecommunications device detects a communications quality indicator greater than a threshold. To name a few examples, the communications quality indicator may be a signal to noise ratio (SNR) or a signal to interference and noise ratio (SINR) that the first telecommunications device detects while transmitting the data block. The exemplary scenario shown in FIG. 3 may help explain this. In that scenario, the first telecommunications device leaves step 120 and enters step 140 just before transmitting the 18th slot because it detects a first ACK. Then, the first telecommunications device leaves step 140 and enters step 160 just before transmitting the 24th slot because it detects a SINR greater than the threshold TH. Once the first telecommunications device enters step 160, it reduces the TX power from a normal power level to a zero power level. The threshold TH may have a fixed value, regardless of the amount of slots of the data block that are already transmitted. Alternatively, the first telecommunications device may change the threshold TH over time.

The first telecommunications device may change the strictness of (i.e. how difficult to satisfy) any of the first and second sets of early termination criteria over time. For example, the first telecommunications device may gradually reduce the strictness of the set of early termination criteria, e.g. by making the strictness negatively correlated with the amount of slots of the data block that are already transmitted. In other words, the set of early termination criteria may have the highest strictness when the first telecommunications device has just begun transmitting the data block. Then, each time the first telecommunications device sends out an additional piece (e.g. slot) of the data block, the first telecommunications device may maintain or lower down the strictness, making the set of criteria equally or more easily to be satisfied.

As an example of step 160, the first telecommunications device may reduce the TX power to a zero power level immediately for the remaining part, i.e. the not yet transmitted part, of the data block. In other words, the first telecommunications device may skip transmitting the remaining part of the data block. The exemplary scenarios shown in FIG. 2 and FIG. 3 may help explain this. In each of these two scenarios, the first telecommunications device reduces it TX power from a normal power level to a zero power level immediately upon entering step 160.

As another example of step 160, the first telecommunications device may gradually reduce the transmission power for the remaining part of the data block. The exemplary scenario shown in FIG. 4 may help explain this. In that scenario, the first telecommunications device leaves step 120 and enters step 140 after the first set of criteria is satisfied. Then, the first telecommunications device leaves step 140 and enters step 160 after the second set of criteria is satisfied. Once the first telecommunications device enters step 160, it reduces the TX power from a normal power level to a zero power level gradually. The TX power may eventually reach the zero power level if there are enough slots remaining.

After step 160, the first telecommunications device may keep detecting whether it has entered step 160 mistakenly. For example, it may determine whether a set of resumption criteria is satisfied. When the set of resumption criteria is satisfied, the first telecommunications device likely has entered step 160 mistakenly, and hence should try to cure the mistake. For example, an exemplary criterion of the set of resumption criteria may be that the first telecommunications device detects a NACK message transmitted by the second telecommunications device.

If the set of resumption criteria is satisfied, the first telecommunications device may cure the mistake by increasing the TX power. For example, the first telecommunications device may increase the TX power to a boosted power level. The boosted power level may be higher than a normal power level of the TX power before being reduced. After increasing the TX power, the first telecommunications device may return to step 120 to see whether it can perform early termination again in the current data block. The exemplary scenario shown in FIG. 5 may help explain this. In that scenario, the first telecommunications device leaves step 120 and enters step 140 after the first set of criteria is satisfied. Then, the first telecommunications device leaves step 140 and enters step 160 after the second set of criteria is satisfied. Once the first telecommunications device enters step 160, it reduces the TX power from a normal power level to a zero power level. Afterwards, the first telecommunications device detects a NACK message, and learns that it shouldn't have entered step 160. Trying to cure this mistake, the first telecommunications device increases its TX power. Afterwards, the first telecommunications device may enter step 120 again to see if it has a second chance to perform early termination properly.

The aforementioned examples may help the first telecommunications device to increase the reliability of early termination of transmission. As mentioned above, proper performance of early termination of transmission may help the first telecommunications device and the second telecommunications device to save energy or time. This is a great advantage, especially when at least one of the two devices is a portable device powered by a battery. In addition, proper performance of early termination of transmission may help reduce interference within the telecommunications system that the first and second telecommunications devices belong to.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A telecommunications method performed by a first telecommunications device while trying to transmit a data block to a second telecommunications device, the method comprising:
   determining whether a first set of early termination criteria is satisfied;
   after determining that the first set of early termination criteria is satisfied, further determining whether a second set of early termination criteria is satisfied, wherein the second set of early termination criteria is different from the first set of early termination criteria, and the second set of early termination criteria is checked after a positive early terminal indicator transmitted from the second telecommunications device is received;
   if both the first set of early termination criteria and the second set of early termination criteria are satisfied before the first telecommunications device finishes transmitting the data block, reducing a transmission power;

wherein the second set of early termination criteria comprises at least one of detecting an amount of the received positive early terminal indicator and detecting a communications quality indicator.

2. The method of claim 1, wherein the first set of early termination criteria comprises:
the first telecommunications device detects a positive early termination indicator transmitted by the second telecommunications device.

3. The method of claim 1, wherein the first set of early termination criteria comprises:
the first telecommunications device detects a positive early termination indicator transmitted by the second telecommunications device; and
the first telecommunications device has transmitted at least a predetermined number of pieces of the data block.

4. The method of claim 1, wherein the second set of early termination criteria comprises:
the first telecommunications device detects at least a predetermined number of positive early termination indicators transmitted by the second telecommunications device.

5. The method of claim 1, wherein the second set of early termination criteria comprises:
the first telecommunications device detects a communications quality indicator greater than a threshold.

6. The method of claim 5, wherein the communications quality indicator is an SNR or an SINK.

7. The method of claim 1, further comprising:
gradually reducing the strictness of at least one of the first set of early termination criteria and the second set of early termination criteria.

8. The method of claim 1, wherein the step of reducing the transmission power comprises:
reducing the transmission power gradually until the transmission power reaches a zero power level.

9. The method of claim 1, further comprising:
after reducing the transmission power, determining whether a set of resumption criteria is satisfied; and
if the set of resumption criteria is satisfied, increasing the transmission power.

10. The method of claim 9, wherein the step of increasing the transmission power comprises:
increasing the transmission power to a boosted power level, wherein the boosted power level is higher than a normal power level of the transmission power before being reduced.

11. The method of claim 9, wherein the set of resumption criteria comprises:
the first telecommunications device detects a negative early termination indicator transmitted by the second telecommunications device.

12. The method of claim 1, wherein the first telecommunications device and the second telecommunications device are WCDMA telecommunications devices.

13. A telecommunications method performed by a first telecommunications device while trying to transmit a data block to a second telecommunications device, the method comprising:

determining whether a first set of early termination criteria is satisfied; and
after determining that the first set of early termination criteria is satisfied, further determining whether a second set of early termination criteria is satisfied, wherein the second set of early termination criteria is different from the first set of early termination criteria, and the second set of early termination criteria is checked after a positive early terminal indicator transmitted from the second telecommunications device is received;
wherein the second set of early termination criteria comprises at least one of detecting an amount of the received positive early terminal indicator and detecting a communications quality indicator.

14. The method of claim 13, wherein the first set of early termination criteria comprises:
the first telecommunications device detects a positive early termination indicator transmitted by the second telecommunications device.

15. The method of claim 13, wherein the first set of early termination criteria comprises:
the first telecommunications device detects a positive early termination indicator transmitted by the second telecommunications device; and
the first telecommunications device has transmitted at least a predetermined number of pieces of the data block.

16. The method of claim 13, wherein the second set of early termination criteria comprises:
the first telecommunications device detects at least a predetermined number of positive early termination indicators transmitted by the second telecommunications device.

17. The method of claim 13, wherein the second set of early termination criteria comprises:
the first telecommunications device detects a communications quality indicator greater than a threshold.

18. The method of claim 13, further comprising:
gradually reducing the strictness of at least one of the first set of early termination criteria and the second set of early termination criteria.

19. The method of claim 13, further comprising:
if both the first set of early termination criteria and the second set of early termination criteria are satisfied before the first telecommunications device finishes transmitting the data block, reducing a transmission power;
after reducing the transmission power, determining whether a set of resumption criteria is satisfied; and
if the set of resumption criteria is satisfied, increasing the transmission power.

20. The method of claim 19, wherein the set of resumption criteria comprises:
the first telecommunications device detects a negative early termination indicator transmitted by the second telecommunications device.

* * * * *